United States Patent [19]

Yoshida

[11] Patent Number: 5,039,162

[45] Date of Patent: Aug. 13, 1991

[54] CHAIR SERVING AS A SAFETY DEVICE

[76] Inventor: Tokuichiro Yoshida, 13-14, Ise-cho, Kawasaki-ku, Kawasaki-shi, Japan

[21] Appl. No.: 489,070

[22] Filed: Mar. 7, 1990

[51] Int. Cl.$^5$ .............................................. B60N 2/42
[52] U.S. Cl. .............................. 297/216; 297/DIG. 8; 244/141
[58] Field of Search .......... 297/216, DIG. 9, DIG. 8; 244/129.2, 140, 141, 122 R, 137.1, 137.2

[56] References Cited

U.S. PATENT DOCUMENTS

| | | | |
|---|---|---|---|
| 2,733,027 | 1/1956 | Gero | 244/140 |
| 2,986,361 | 5/1961 | Codding | 244/140 |
| 3,042,347 | 7/1962 | Halsey | 244/141 |
| 3,218,103 | 11/1965 | Boyce | 244/122 R |
| 3,495,874 | 2/1970 | Dean | 297/DIG. 8 X |
| 4,261,535 | 4/1981 | Swanson | 244/141 X |
| 4,274,526 | 6/1981 | Sims | 244/137.2 X |
| 4,676,463 | 6/1987 | Tansill | 244/129.2 |
| 4,821,984 | 4/1989 | Yoshida | 244/141 |
| 4,892,769 | 1/1990 | Perdelwitz, Jr. et al. | 297/DIG. 5 X |

FOREIGN PATENT DOCUMENTS 420961 2/1911 France .................................. 244/140

Primary Examiner—Jose V. Chen
Attorney, Agent, or Firm—Fleit, Jacobson, Cohn, Price, Holman & Stern

[57] ABSTRACT

A chair (1) serving as a safety device for a passenger in an airplane includes a plural circular array of balloon elements (2) each comprising an inflatable balloon member (2a, 2a') made of heat resistant elastomeric sheet material and a hose portion (2b, 2b') through which compressed air is supplied from a storage chamber (3) under the seat (4) of the chair to the balloon member. The balloon elements are folded in a predetermined order of arrays around the chair, except the seat and backrest portions, and in an emergency are inflated with the compressed air so that they are expanded, unfolded and extended outwardly of the chair in plural radial directions to form a single large expanded cellular balloon structure with the passenger located at a central part thereof, each inflated element being a cell of the expanded balloon structure. This large balloon structure functions as a safety device for the passenger. An emergency valve is actuated by a pilot or, alternatively, by an individual passenger for use.

10 Claims, 7 Drawing Sheets 5,039,162

CHAIR SERVING AS A SAFETY DEVICE

BACKGROUND OF THE INVENTION

The present invention relates generally to a chair serving as a safety device for a passenger in an airplane in the event of an emergency and more particularly to a safety device in the form of a large balloon structure with a passenger located at the central part thereof.

Many proposals have been heretofore made for a safety device usable for a passenger in an airplane. The conventional safety device is usually constructed in the form of a parachute which is shot together with a passenger away from the airplane in the event of an emergency by using an explosive or a rocket. However, the conventional safety device has the drawbacks that it is difficult from the design viewpoint to practically shoot the parachute along with a passenger away from the airplane through a housing structure of the airplane and even if possible, the safety device is at an expensive cost to fabricate.

SUMMARY OF THE INVENTION

The present invention has been made with the foregoing background in mind and its object resides in providing a chair serving as a safety device for a passenger in the event of an emergency such as airplane collision or the like, wherein the safety device is simple in structure and can be fabricated at an inexpensive cost.

To accomplish the above object, the present invention provides a chair serving as a safety device for a passenger in an airplane in the event of an emergency, wherein the chair includes a compressed air supply source, a pressure resistant air storage chamber arranged below a seat portion of the chair on which the passenger sits, plural circular arrays of balloon elements arranged around the chair exclusive of the seat portion and rest back portion of the seat, each balloon element, or cell, comprising a balloon portion made of heat resistance elastomeric film material and a hose portion having a length which differs from array to array, the balloon elements being normally folded in a predetermined order around the chair except in the seat and backrest portions. In the event of an emergency, compressed air is supplied from the compressed air source so that the balloon elements or cells, are filled with compressed air supplied via the air storage chamber and the hose portions, and thereby the balloon elements are three-dimensionally expanded, unfolded and extended away from the air storage chamber in plural radial directions to form a single large expanded cellular balloon structure with the chair located at the central part thereof, the large balloon structure functioning as a safety device as it descends in the air, and emergency valve means adapted to be actuated by a pilot or an individual passenger so as to allow compressed air to be supplied to the balloon portions via the air storage chamber and the hose portions in the event of an emergency.

To assure that the safety device is operated correctly, the chair is disconnectable from the floor of the airplane in the event of an emergency.

A number of balloon elements normally folded in a predetermined order round the chair are firmly held by a cover sheet.

Usually, a single compressed air supply source is provided in the airplane. Alternatively, a compressed air supply source may be provided in an individual air storage chamber.

BRIEF DESCRIPTION OF THE DRAWINGS

Other objects, features and advantages of the present invention will be apparent from reading of the following description with reference to the accompanying drawings, wherein.

Figure 1:
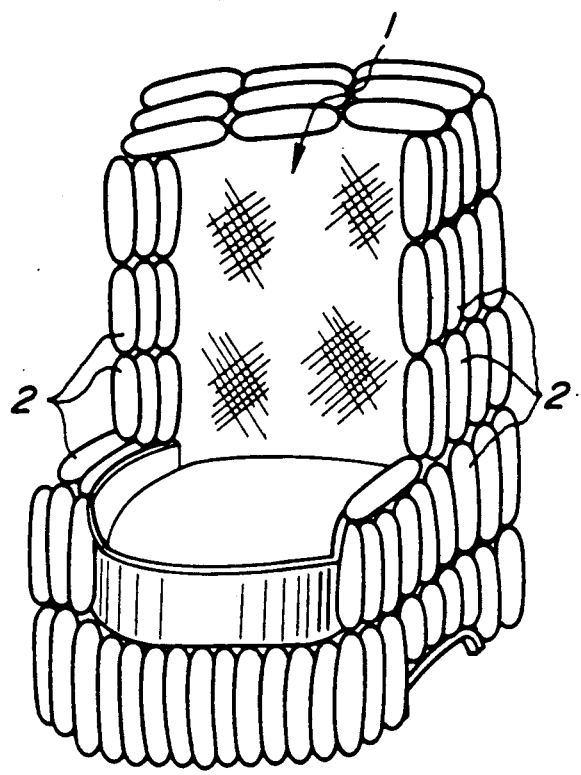
FIG. 1 is a perspective view of a chair serving as a safety device in the event of an emergency in accordance with an embodiment of the present invention.
Figure 3:
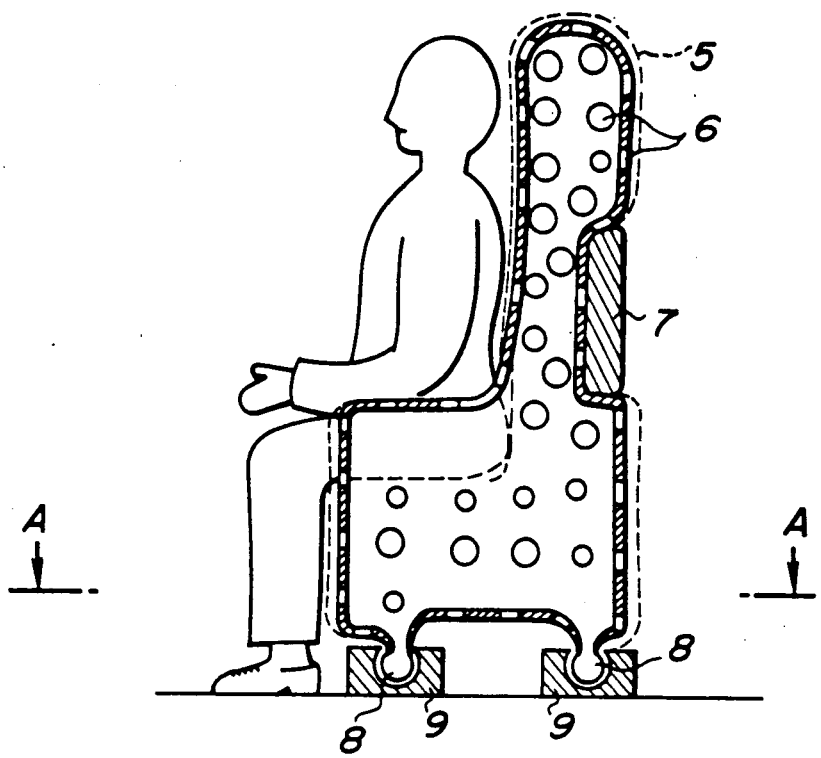
FIG. 3 is a cross-sectional right side view of the chair in FIG. 1, particularly illustrating how a passenger sits on the chair.
Figure 5A:
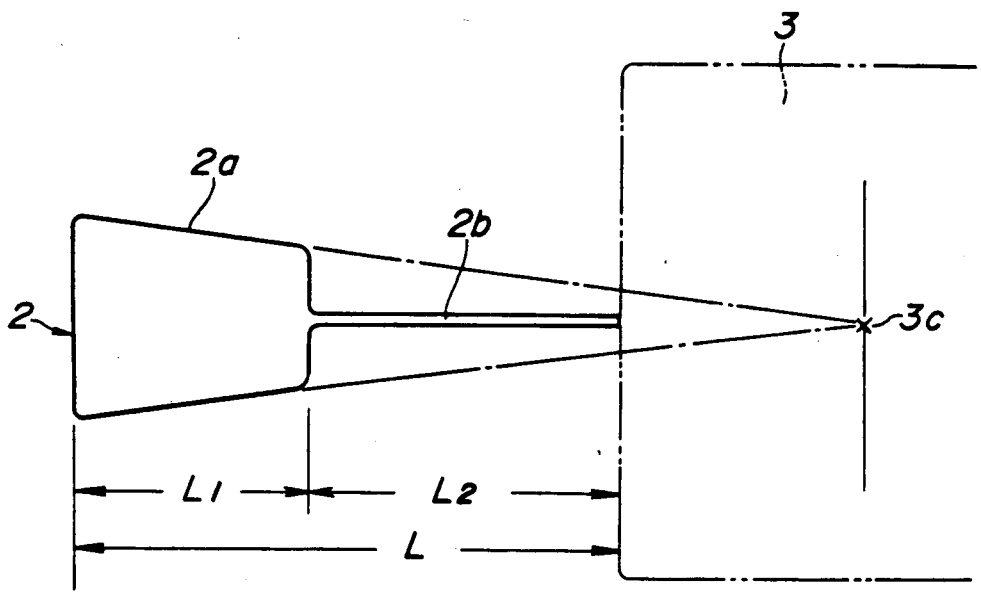
Figure 5B:
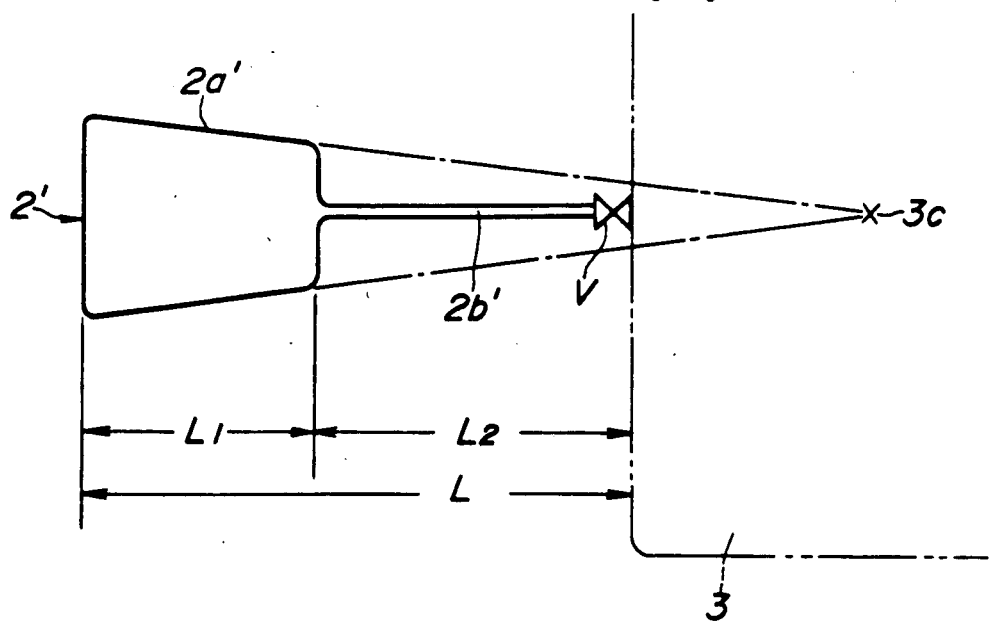
Figure 6:
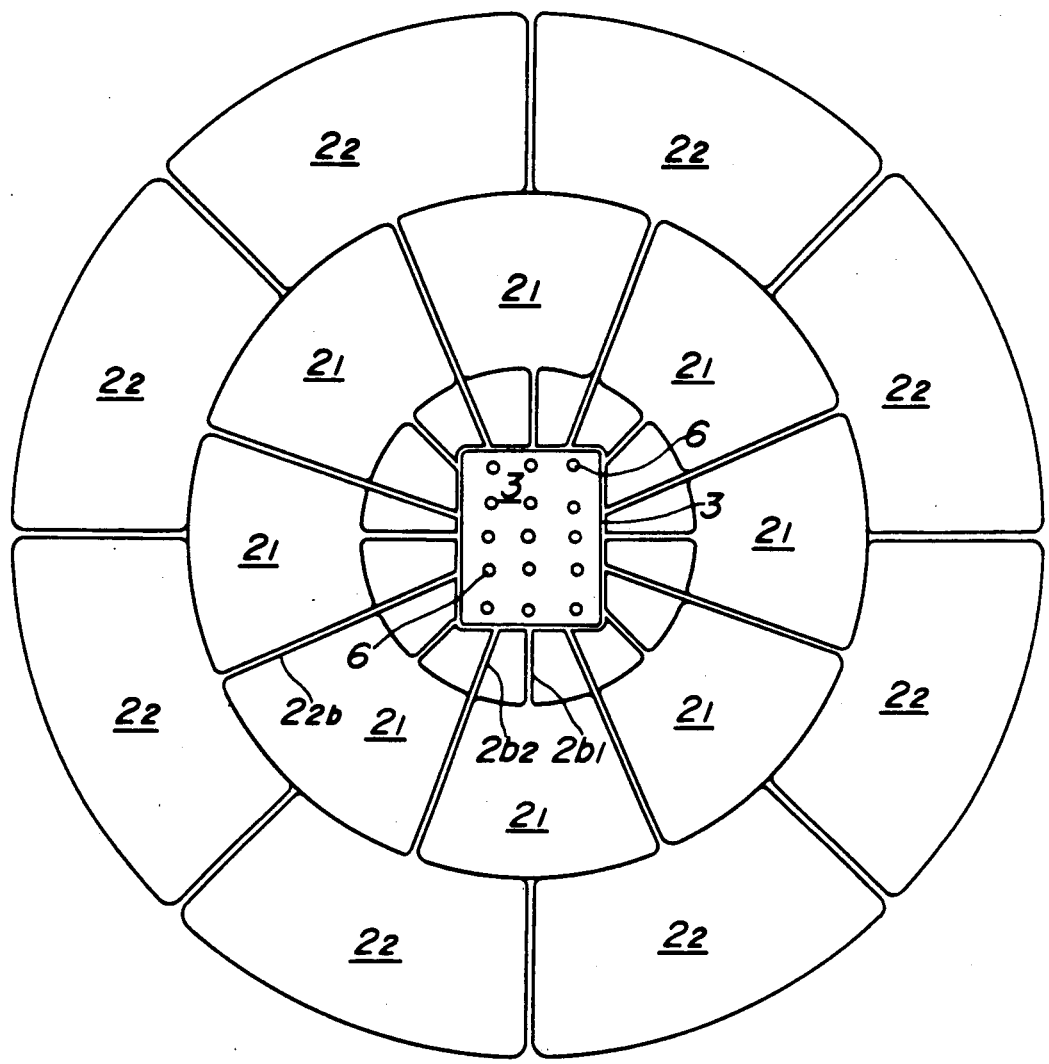
Figure 7:
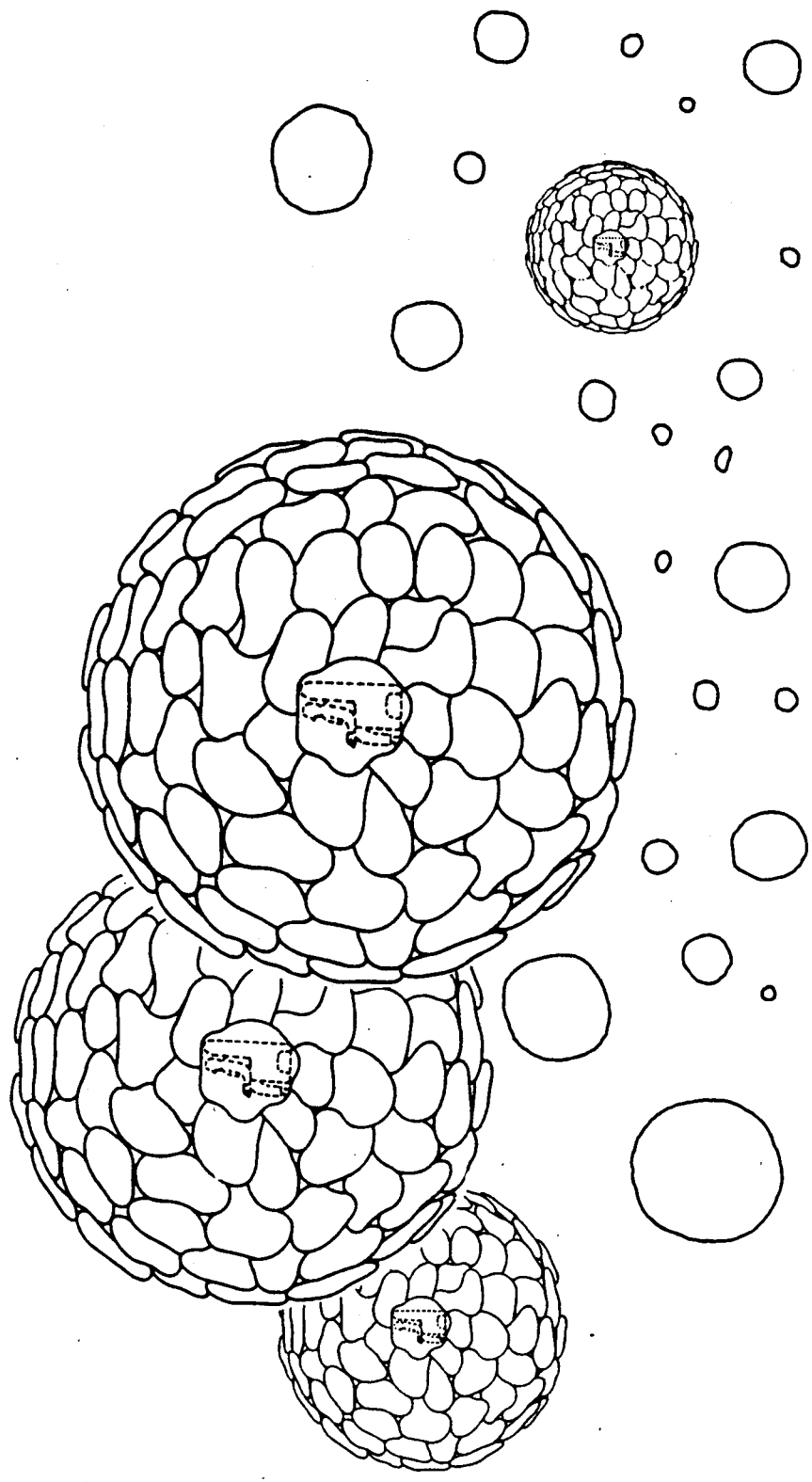
Figure 8:
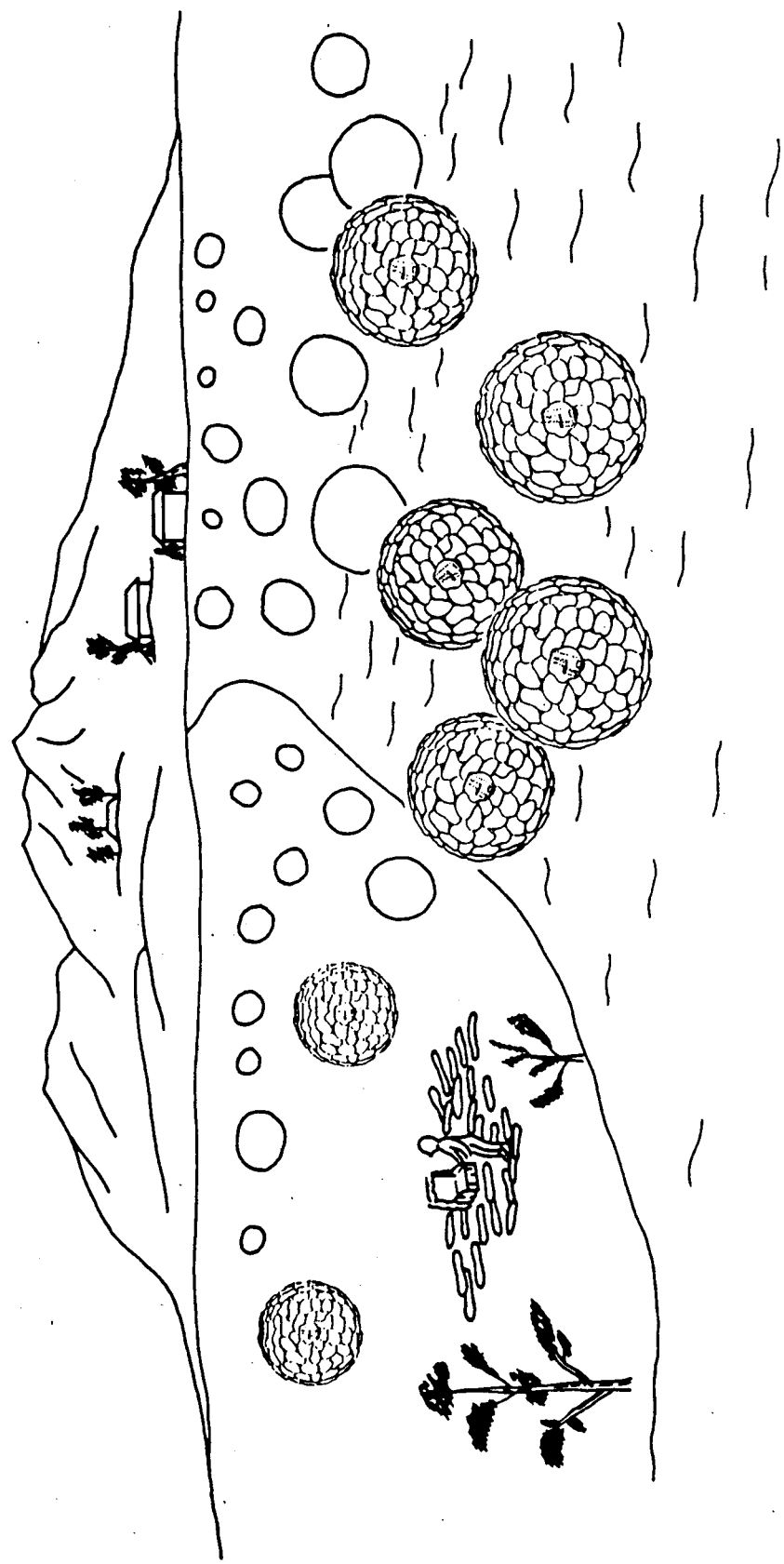
Figure 9:
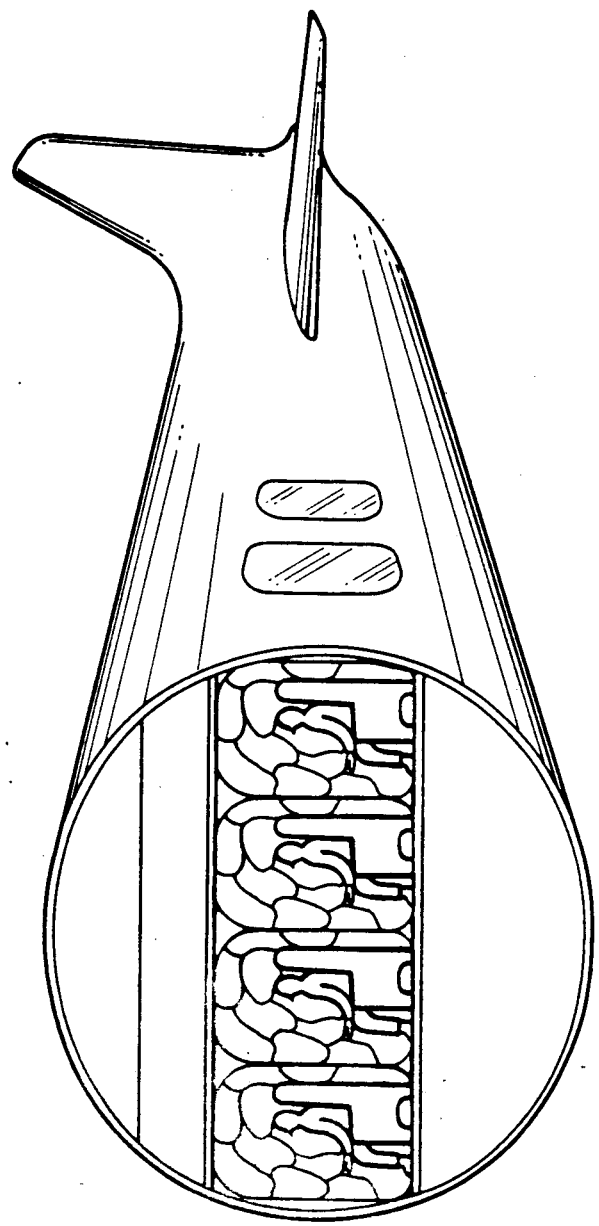

FIG. is a cross-sectional view of the chair in FIG. 1;

FIG. 5(a) and FIG. 5(b) are a plan view of a single balloon element in an unexpanded state, respectively, wherein FIG. 5(a) illustrates a case where the balloon element is connected directly to a pressure resistant air storage chamber and FIG. 5(b) illustrates a case where the balloon element is connected to the air storage chamber via an emergency valve;

FIG. 6 is a sectional view of the chair taken along line A—A in FIG. 3, particularly illustrating an inoperative state where a number of balloon elements are unfolded in the radial direction, wherein each balloon element is not filled with compressed air which is to be supplied from a compressed air supply source via a hose portion in the event of an emergency;

FIG. 7 is an explanatory diagrammatic view illustrating a number of balloons each serving as a safety device floating one after another in the air, wherein the largest balloon carries a passenger at its central part;

FIG. 8 is an explanatory view illustrating some balloons landing on the water surface of a sea and some balloons landing on the ground of a beach;

FIG. 9 is an explanatory diagrammatic view taken through the hull of an airplane illustrating how balloons expand in the airplane.

DESCRIPTION OF THE PREFERRED EMBODIMENT

Now, the present invention will be described in detail hereinafter with reference to the accompanying drawings which illustrate a preferred embodiment thereof.

FIG. 1 schematically shows an ordinary chair 1 usable for an airplane to which the present invention is applied. Referring to FIG. 5, the purport of the present invention consists in that a number of balloon elements 2 each comprising a balloon portion, or cell, $2_a$ (which will be described later) serves as part of a safety device in an expanded state in the event of an emergency and a hose portion $2_b$ (which will be described later) for connecting the balloon portion $2_a$ to a pressure resistant air storage chamber 3.

Referring to FIGS. 5 and 6, the safety device of the present invention is constructed such that in the event of an emergency, emergency valve means (not shown) is actuated and thereby a number of expanded balloon elements 2 are three-dimensionally extended in the radial direction to define a single large cellular balloon structure which serves as a safety device.

As will be apparent from FIG. 6 which is an enlarged sectional view of the safety device in an unfolded state taken on line A—A in FIG. 3, the safety device of the present invention comprises a first circular array of balloon elements $2_1$, a second circular array of balloon elements $2_2$, - - - and a nth array of circular array of balloon elements $2_n$ with the air storage chamber 3 located at the center of a single large balloon structure.

Figure 2:
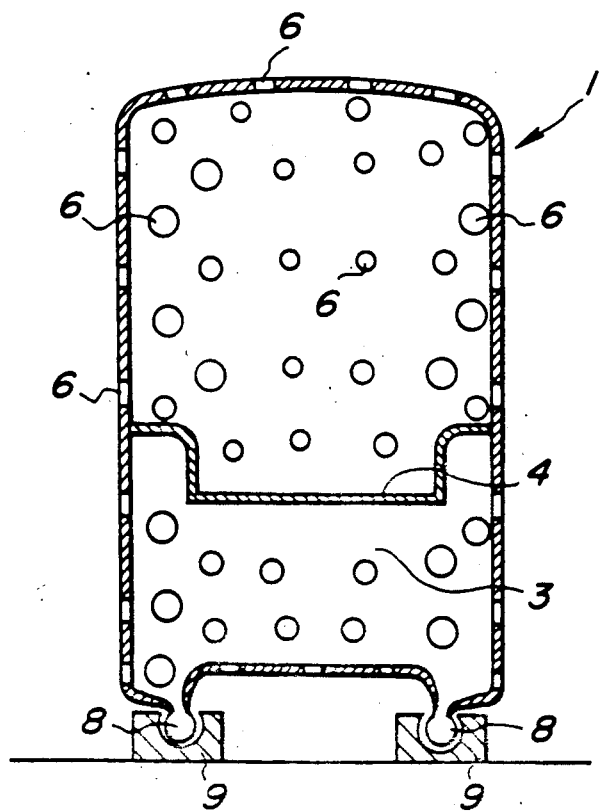
FIG. 2 is a front cross-sectional view of the chair in FIG. 1 with a cover removed therefrom.

As shown in FIG. 2, the chair 1 is constructed such that its lower part, is an air storage chamber 3 below a seat 4 into which compressed air having a high pressure is introduced from a compressed air supply source (not shown). Each of the balloon elements $2_1, 2_2, ---, 2_n$ is communicated with the air storage chamber 3 via hose portions $2_b$. Referring to FIG. 6 again, the first circular array of balloon elements $2_1$ are communicated with the air storage chamber 3 via the shortest hose portions $2_{b1}$, and the second circular array of balloon elements $2_2$ are communicated with the air storage chamber 3 via the second shorter hoses $2_{b2}$. The nth array of balloon elements $2_n$ are communicated with the air storage chamber 3 via the longest hoses $2_{bn}$.

Here, the balloon element 2, i.e., the most essential component for the safety device will be described in detail with reference to FIG. 5(a) and FIG. 5(b) below.

FIG. 5(a) is a plan view showing a balloon element 2 in an unexpanded state in a case where the balloon element 2 is connected directly to the air storage chamber 3 with no valve means therebewteen, and FIG. 5(b) is a plan view showing a balloon element 2' in an unexpanded state in a case where the balloon element 2' is connected to the air storage chamber 3 with valve means v interposed between the innermost end of a hose portion $2_b$ and the air storage chamber 3. In case of an emergency, compressed air supplied from the compressed air supply source (not shown) is supplied to the balloon portion $2_a$ via the air storage chamber 3 and the hose portion, $2_b$, or $2_b'$;

As is apparent from FIG. 5 (a), the balloon portion $2_a$ made of heat resistant elastomeric film material exhibits a truncated conical shape in an unfolded state and has a length $L_1$. Both sides of the balloon portion $2_a$ are converged toward the center $3_c$ of the air storage chamber 3. The hose portion $2_b$ has a length $L_2$ so that the balloon element 2 has a length L.

The balloon portion $2_a$ in FIG. 5(b) is identical to that in FIG. 5(a) with the exception that the valve means v is interposed between the hose portion $2(b)$, and the air storage chamber 3 and a distance $L_2$ between the hose portion $2_b$. and the air storage chamber 3 comprises a length of the hose portion $2_b$ and a length of the valve means v. Both sides of the balloon portion $2_a$ are likewise converged toward the center 3 of the air storage chamber 3.

FIG. 6 is a sectional view of the chair taken one line A—A in FIG. 3 and shows a first circular array of balloon elements $2_1$, and a second circular array of balloon elements $2_2$ in an inflated, expanded and unfolded state in the horizontal direction. A third circular array of balloon elements and other outer circular arrays of balloon elements are not shown in the drawing for the purpose of simplification of illustration. Each first circular array balloon element $2_1$ is connected to the air storage chamber 3 via the hose portion $2_{b1}$ and each second circular array balloon element $2_2$ is likewise connected to the air storage chamber 3 via the hose portion $22_b$ which extends between adjacent the first array balloon portions $2_{a1}$. Accordingly, the hose portion $2_2$ is longer than the hose portion $2_{b1}$. It should be noted that FIG. 6 illustrates that each balloon element is extended in the horizontal direction in an expanded unfolded state and all the balloon elements are practically arranged together with their hose portions in a folded state around the chair 1 exclusive of its seat and back portion of the seat, as shown in FIG. 1.

FIG. 6 illustrates only one example of arrangement of a number of balloon elements around the chair 1 and a large number of balloon elements are arranged in a correctly folded state prior to inflation round the chair 1 so as to assure that when inflated and expanded all the balloon elements are three-dimensionally extended in the event of an emergency to form a cellular spherical configuration with the chair 1 located at the center of the large balloon structure.

Next, operation of the chair of the present invention will be described below.

Figure 4:
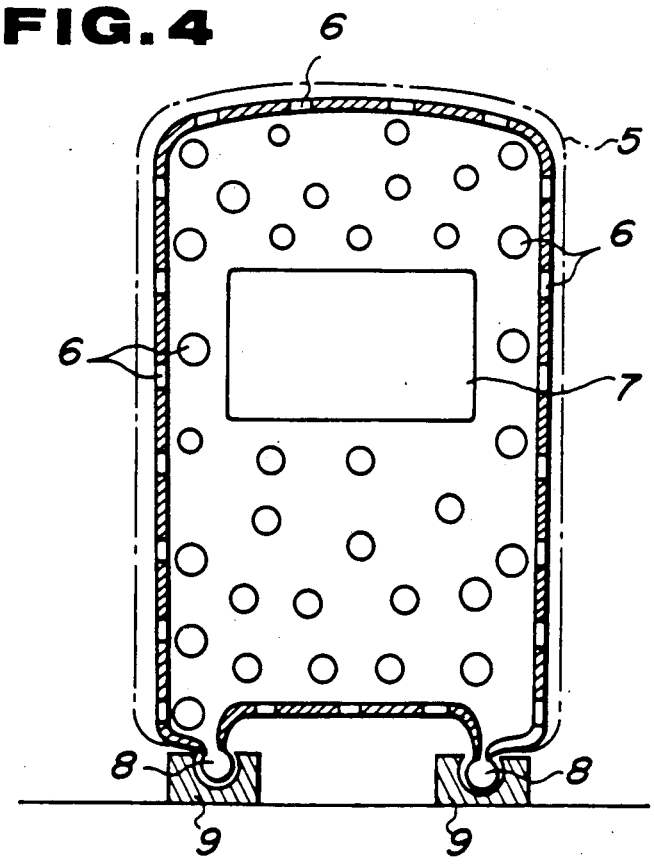

If an emergency such as airplane collision or the like takes place with two airplanes, a pilot or each passenger immediately actuates emergency valve means. In response to actuation of the valve means, compressed air is supplied to all balloon elements 2 from the compressed air supply source via the air storage chamber 3 below the seat 4 of the chair 1 and a number of the hose portions $2_b$. Consequently, a cover 5 placed round the chair 1 to firmly hold the folded balloon portions is broken due to expansion of the balloon elements 2 and thereafter all the balloon elements 2 are three-dimensionally extended until a single large expanded balloon structure is formed. This provides a situation wherein a passenger is ready to leave the housing structure of the broken airplane and fly down in the air while he is encased in the large balloon structure. This large balloon structure comprising a number of balloon elements and having a passenger located at the center of the large balloon structure safely lands on the water surface of a sea or the ground surface (see FIG. 8). FIG. 7 shows that a number of balloon structures each constructed in the above-described manner flies in the air one after another. It is important that when a passenger leaves the broken airplane with the expanded balloon structure, the chair with the passenger seated thereon is readily disconnected from the floor of the airplane. To this end, the chair 1 includes four disconnectable leg ends 8 each exhibiting a spherical configuration, as shown in FIGS. 2 to 4. Thus, the chair 1 is disconnectably installed on four spherically recessed mounts 9 on the floor of the airplane.

In FIGS. 2 to 4, reference numeral 6 designates a hose hole to which the hose portion $2_b$ of the balloon element 2 is firmly connected so as to allow compressed air to be supplied to the balloon portion $2_a$ via the hose portion $2_b$. As is apparent from these drawings, a large number of hose holes 6 are distributed over the chair 1 in a substantially equally spaced relationship with the exception of the seat and the back of the chair 1. Reference numeral 7 designates a turnable table which is usable for a passenger seating on a next rear chair 1 when he eats food or puts a book or the like article thereon.

Another advantageous feature of the chair of the present invention is that in the event of an emergency, when air or oxygen fails to be supplied to each passenger in the airplane, a pilot or a passenger actuates the emergency valve means for air supply from the compressed air supply source (not shown) to expand the balloon elements within the interior of the airplane. Thus, a passenger can breath via one of the expanded balloon elements 2 by sucking air in the expanded balloon element 2 through a cut hole (not shown) on the expanded balloon element.

When a balloon safely lands on the ground, a passenger encased in the balloon structure cuts off hose portions and then leaves the balloon to reach a safe zone.

When balloons expand in the airplane, they prevent the actions of hi-jackers.

When fire occurs in the airplane, the space outside the balloons becomes very little, thereby retarding the fire from spreading.

While the present invention has been described above with respect to a single preferred embodiment, it should of course be understood that various changes or modifications may be made without departure from the scope of the invention as defined by the appended claims.

I claim:

1. A chair serving as a safety device for a passenger in an airplane in the event of an emergency comprising:
   a chair having a seat portion on which a passenger sits and a backrest portion thereof;
   a compressed air supply source;
   a pressure resistant air storage chamber arranged below said seat portion of said chair and communicating with said compressed air supply source;
   a plurality of balloon elements arranged substantially circularly in arrays around said chair, except said seat and backrest portions, at varying distances outwardly of said chairs, each balloon element comprising an inflatable expandable balloon member made of heat resistant elastomeric film material;
   a plurality of hose elements connecting said balloon members to said air storage chamber, said hose elements having different lengths depending on the distances of said arrays outwardly of said chair;
   said balloon elements being normally folded in a predetermined order around said chair except said seat and backrest portions; and
   emergency valve means adapted to be actuated manually to apply compressed air from said source thereof to said balloon elements via said hose elements to inflate and expand said balloon elements so that in an emergency, said valve means is operated to supply compressed air to said balloon elements to inflate, unfold and expand said balloon elements three-dimensionally and extend said balloon elements outwardly of said chair in plural radial directions to form a single expanded cellular balloon structure with said chair located substantially at the central part thereof.

2. The chair as claimed in claim 1, wherein said balloon elements each have sides which substantially converge toward the center of said air storage chamber.

3. The chair as claimed in claim 2, and further comprising:
   means for mounting said chair disconnectably to a floor of the airplane so that said chair is released from the floor in the event of an emergency.

4. The chair as claimed in claim 1, and further comprising:
   means for mounting said chair disconnectably to a floor of the airplane so that said chair is released from the floor in the event of an emergency.

5. The chair as claimed in claim 1, wherein:
   said compressed air supply source comprises a single source provided in the airplane.

6. The chair as claimed in claim 1, wherein:
   said compressed air supply source comprises an individual source for each chair.

7. A chair serving as a safety device for a passenger in an airplane in the event of an emergency comprising:
   a chair having a seat portion on which a passenger sits and a backrest portion thereof;
   a compressed air supply source;
   a pressure resistant air storage chamber arranged below said seat portion of said chair and communicating with said compressed air supply source;
   a plurality of balloon elements arranged substantially circularly in arrays around said chair, except said seat and backrest portions, at varying distances outwardly of said chairs, each balloon element comprising an inflatable expandable balloon member made of heat resistant elastomeric film material;
   a plurality of hose elements connecting said balloon members to said air storage chamber, said hose elements having different lengths depending on the distances of said arrays outwardly of said chair;
   said balloon elements being normally folded in a predetermined order around said chair except said seat and backrest portions; and
   a cover means over said folded balloon elements for holding said balloon elements in the folded position; and
   emergency valve means adapted to be actuated manually to apply compressed air from said source thereof to said balloon elements via said hose elements to inflate and expand said balloon elements so that in an emergency, said valve means is operated to supply compressed air to said balloon elements to inflate, unfold and expand said balloon elements three-dimensionally and extend said balloon elements outwardly of said chair in plural radial directions to form a single expanded cellular balloon structure with said chair located substantially at the central part thereof.

8. The chair as claimed in claim 7, wherein said balloon elements each have sides which substantially converge toward the center of said air storage chamber.

9. The chair as claimed in claim 8, and further comprising:
   means for mounting said chair disconnectably to a floor of the airplane so that said chair is released from the floor in the event of an emergency.

10. The chair as claimed in claim 7, and further comprising:
    means for mounting said chair disconnectably to a floor of the airplane so that said chair is released from the floor in the event of an emergency.

* * * * *